Patented Dec. 16, 1952

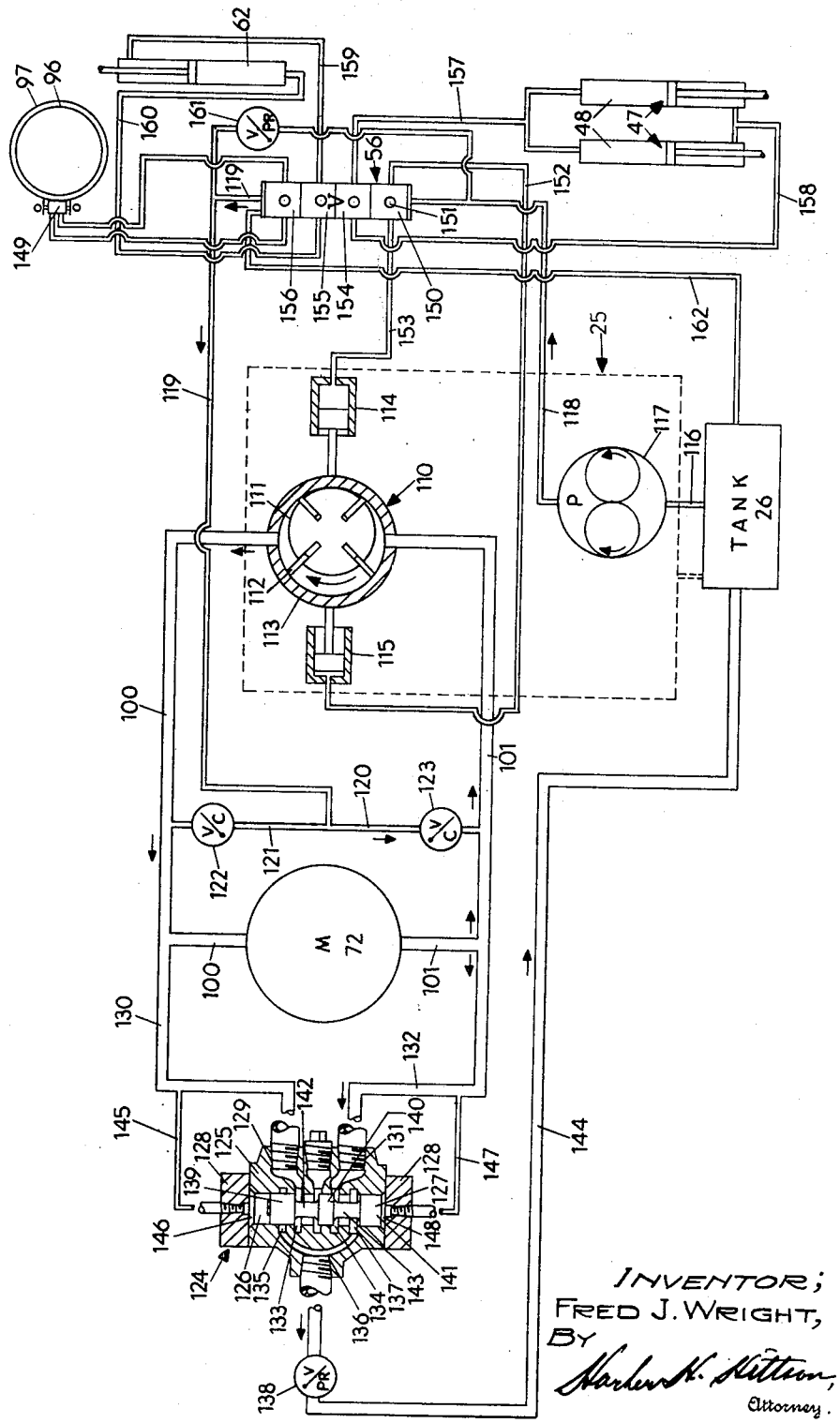

2,621,479

UNITED STATES PATENT OFFICE 2,621,479

HYDRAULIC SYSTEM, INCLUDING A COOLING CIRCUIT FOR THE PUMPS THEREOF

Fred J. Wright, Columbus, Ohio, assignor to The Galion Iron Works & Manufacturing Company, a corporation of Ohio Original application April 21, 1948, Serial No. 22,390. Divided and this application April 8, 1950, Serial No. 154,790

2 Claims. (Cl. 60—53)

1

This invention relates to hydraulic systems.

It is an object of the invention to provide an improved hydraulic system wherein there is included a substantially closed hydraulic circuit having a high pressure and a high volume pump and a hydraulic motor driven thereby, fluid in the closed circuit being recirculated, and a second hydraulic circuit including a hydraulic pump adapted to discharge hydraulic make-up and cooling fluid into said substantially closed circuit whereby all of said make-up and cooling fluid is supplied to the engine of the high volume and high pressure pump, and its addition to the substantially closed hydraulic circuit causes displacement of hot hydraulic fluid therefrom.

Other objects of the invention will appear hereinafter, the novel features and combinations being set forth in the appended claims.

The accompanying drawing illustrates diagrammatically the hydraulic system of a three-wheeled trench roller that embodies the features of my invention.

This application is a division of my application, Serial No. 22,390, filed April 21, 1948, for a Motorized Trench Roller, and only so much of the trench roller will be described here as is necessary to an understanding of the function of the hydraulic motors of the hydraulic system shown in the drawing.

The trench roller that embodies the hydraulic system shown in the drawing is a three-wheeled or tricycle type roller that includes at one side a wide rimmed roll. At the side opposite the wide rimmed roll it includes a bicycle unit, the wheels of which when in tandem position are reversely steerable to steer the roller when the roll is rolling material and which may be swung to parallel positions in order that the wide rimmed roll may be carried by a towing vehicle and the roller towed as a two-wheeled trailer.

The main frame of the roller includes two spaced rigid frame parts, one of which carries the wide rimmed roll and the other of which in effect forms the frame of the bicycle unit. These two spaced rigid side frame parts are connected by struts pivoted to each of them so as to form an adjustable parallelogram main frame for the entire trench roller. The wheels of the bicycle unit or portion of the trench roller are swung for steering purposes and to their parallel positions by the hydraulic motor indicated at 62 in the drawing, and the main frame of the roller is adjusted as a parallelogram to change the elevation of the planes in which the axes of the wheels of the bicycle unit and the axis of the wide rimmed roll lie, by the motors indicated at 47 in the drawing. The wide rimmed roll is driven by a reversible rotary hydraulic motor indicated at 72 in the drawing, and the roll is provided with brake mechanism including a brake drum 96 and a brake band 97.

The hydraulic system includes a closed high pressure and high volume hydraulic circuit which includes a high pressure variable delivery reversible pump 110 which is capable of being adjusted from a zero output volume to a large or high output volume of hydraulic fluid under high pressure. The high pressure and high volume hydraulic circuit also includes a high pressure and high volume reversible radial type hydraulic motor 72 that reversibly drives the roll. Conduits 100 and 101 connect the high pressure variable delivery reversible pump 110 with the motor 72. The pump 110, as indicated in the drawing, is discharging or pumping hydraulic fluid into the conduit 100 to drive the roll motor 72. Conduit 101 conducts the hydraulic fluid exhausted from the motor 72 to the port of the pump 110 acting as the intake or suction port thereof.

The hydraulic fluid in the closed circuit including pump 110, conduit 100, motor 72 and conduit 101 is recirculated; that is, fluid exhausted by the motor 72 flows back to the pump 110 through the conduit 101 and is pumped by the pump 110 through conduit 100 back to the motor 72. The output volume of pump 110 may be varied from zero to a high volume and the pump 110 includes a rotor 111 having reciprocating vanes 112 that operate in a ring or housing 113, the axis of which may be shifted with respect to the axis of the rotor 111. It will be seen, of course, that when the axis of the rotor 111 and the axis of the ring or housing 113 coincide, the pump 110 will not be operating to produce any output of hydraulic fluid either into the conduit 100 or 101. In order to cause the pump 110 to pump hydraulic fluid the axis of ring or housing 113 may be shifted or off-set with respect to the axis of rotor 111 either to the right or left, and the amount of off-setting of these axes determines the output volume of pump 110. If the ring or housing 113 is shifted to the left, as indicated in the drawing, the pump 110 will discharge into conduit 100, and if the ring or housing 113 is shifted to the right, the pump 110 will discharge into conduit 101. The ring or housing 113 is shifted to the right by a piston motor 114 and to the left by a piston motor 115.

The entire hydraulic system also includes a tank 26 which is a reservoir for hydraulic fluid used in the hydraulic system. From the hydraulic tank 26 a supply conduit 116 leads to a low volume low pressure constant delivery pump 117. In the trench roller shown and described in my co-pending application, Serial No. 22,390, above identified, pumps 110 and 117 are both contained within a pump unit 25 and both may be driven from the same shaft, which shaft is driven by an internal combustion engine, not shown. The hydraulic fluid pumped by pump 117 is conducted through a conduit 118 into one end of a control valve unit 56. For the moment it will suffice to say of the control valve unit 56 that hydraulic fluid normally passes through it and is discharged from the opposite end thereof into a conduit 119 that leads to conduits 120 and 121 which connect respectively with conduits 101 and 100.

Conduit 121 includes a check valve 122 and conduit 120 includes a check valve 123. When the closed hydraulic circuit including pump 110, motor 72 and conduits 100 and 101 is operating, as previously described, the output of hydraulic fluid pumped by pump 110 is supplied to motor 72 through conduit 100 and the pressure in conduit 100 will close the check valve 122 in conduit 121. Conduit 101 which is acting as the low pressure conduit of the closed system and through which hydraulic fluid is being conducted from the motor 72 to the intake or suction port of motor 110 will be subjected to a relatively low hydraulic pressure, and check valve 123 in conduit 120 will open under pressure of the hydraulic fluid pumped by pump 117 in conduits 119 and 120 to admit the hydraulic fluid pumped by pump 117 to the conduit 101. It will be seen, of course, that the volume of hydraulic fluid flowing into conduit 101 will be considerably less than the volume of the hydraulic fluid discharged from the motor 72 when pump 110 is operating at full capacity, but it will also be seen that an amount of hydraulic fluid substantially equal to the amount added by the pump 117 to the conduit 101 must be displaced from the low pressure conduit 101.

It will be seen also that when the output volume or pressure of pump 110 is directed into conduit 101 the pressure in conduit 101 will close check valve 123, and check valve 122 in conduit 121 will open to pass the hydraulic fluid pumped by pump 117 into the conduit 100, acting as the low pressure or suction side of the high pressure closed system. In order to permit hydraulic fluid to be displaced from the conduits 101 and 100 there is connected to the conduits 100 and 101 of the high pressure high volume closed circuit a shiftable spool type valve 124.

Valve 124 includes a body 125 having a central bore 126 in which there is slidably received a piston or spool 127. The ends of body 125 are closed by caps 128. The body 125 of valve 124 includes a threaded opening 129 that receives a conduit 130 connected to the conduit 100, and the body 125 includes another threaded opening 131 that receives a conduit 132 connected to conduit 101. Threaded opening 129 connects with an annular channel 133 formed in the bore 126, and the threaded opening 131 connects with another channel 134 in the bore 126. Spaced outwardly of channel 133 in an annular channel 135 that connects with a threaded exhaust opening 136 in the body 125 and spaced outwardly of the annular channel 134 is an annular channel 137 that is also connected with the threaded exhaust opening 136. Threaded exhaust opening 136 receives a conduit 144 in which there is interposed a pressure relief valve 138. Valve 124 is a conventional valve well known to those skilled in the art and in actual construction this valve includes an annular groove positioned centrally of the bore 126 that is connected with a threaded opening in the side of body 125. This central annular groove is unnecessary to the present invention and therefore the port communicating with it is closed by a pipe plug.

The piston 127 of valve 124 includes three spaced lands 139, 140 and 141. Lands 139 and 140 are connected by a reduced diameter portion 142 of the piston 127, and lands 140 and 141 are connected by a reduced diameter portion 143 of the piston 127. The lands are so spaced that when the piston 127 is moved downwardly, as shown in the drawing, the annular channel 134 connected with opening 131 is connected through the bore 126 with the circular opening 137 which in turn is connected to the conduit 144 that leads through the pressure relief valve 138 and to the tank or reservoir 26. The spacing of lands 139 and 140 on piston 127 is also such that when the piston 127 is positioned, as seen in the drawing, to place the annular channels 134 and 137 in communication, the communication between the annular channels 133 and 135 is blocked by the land 139. When the piston 127 is shifted upwardly to its top position the channel 134 will be isolated by the land 141 from the channel 137 to block the flow of fluid through the conduit 132 and this occurs when conduit 101 is acting in the high pressure side of the closed hydraulic circuit.

The piston or spool 127 is shifted from either of its positions described to the other by the differential of hydraulic pressures in the conduits 100 and 101. A control conduit 145 connects conduit 130 and consequently conduit 100 with a chamber 146 in valve 124 formed by the cylinder head 128, the bore 126 and the head of piston 127 adjacent land 139, and a conduit 147 connects conduit 132 and consequently conduit 101 with a chamber 148 in valve 124 similar to chamber 146 but at the opposite end of piston 127.

It will be seen that if conduit 101 is placed, by reversing the output of pump 110, in the high pressure side of the closed circuit, conduit 147 will admit fluid under pressure into chamber 148 to force the piston 127 upwardly which, of course, will cause the land 141 to block the channel 137 to stop the flow of hydraulic fluid from the conduit 132 to the exhaust conduit 144 and that the fluid in chamber 146 will be displaced through conduit 145 into conduit 130 which will be connected by the shifting of the piston 127 through channel 133, bore 126 and channel 135 to the conduit 144. Thus either conduit 100 or 101 when placed in the high pressure side of the closed circuit will be stopped or closed off from the conduit 144 by the valve 124, and the conduit 100 or 101 which is acting as the low pressure side of the closed circuit will be opened by the valve 124 to conduit 144 which is connected to the tank 26 through the pressure relief valve 138.

As previously described, when the conduit 101 is in the low pressure side of the closed circuit a volume of hydraulic fluid substantially equal to the volume of hydraulic fluid placed therein by pump 117 must be displaced therefrom and because conduit 101 is connected to valve 124, conduit 144 and pressure relief valve 138 to tank 26, hydraulic fluid may be displaced from the conduit 101 by opening the pressure relief valve 138.

The hydraulic fluid supplied to the closed hydraulic circuit of motor 72 and pump 110 by pump 117 will be at a lower temperature than the hydraulic fluid exhausted from the motor 72 and thus it will act as a cooling medium or fluid for the high pressure closed circuit. It will also act as make-up fluid, that is, it will replace in the high pressure closed circuit any hydraulic fluid lost therefrom through the glands, joints and the like of pump 110 and motor 72.

It is important to note that the hydraulic fluid pumped by pump 117 into the high pressure closed hydraulic circuit enters the circuit between that port of the motor 72 that is acting as the exhaust port and that port of the pump 110 that is acing as the intake, low pressure or suction port. This arrangement insures that all of the cooling and the make-up hydraulic fluid pumped by pump 117 will flow together with some hot hydraulic fluid discharged by the motor 72 to the pump 110 when the latter is operating at a high output volume whereby the temperature of the hydraulic fluid entering the pump 110 will be substantially lower than the temperature of the hydraulic fluid passing from the exhaust port of the motor 72. Throughout all speeds at which the motor 72 is operating the cooling and make-up hydraulic fluid pumped by pump 117 will cause hot hydraulic fluid to be displaced from the low pressure side of the high pressure closed circuit through the pressure relief valve 138.

It will be seen, of course, that if motor 72 is being driven at such speed or is adjusted so that the intake volume of pump 110 is less than the output volume of pump 117 the entire supply of hydraulic fluid for pump 110 will be comprised of the hydraulic fluid pumped by pump 117, and the volume of hydraulic fluid pumped by pump 117 which is in excess of the intake volume required by pump 110 will be discharged through valve 124, conduit 144 and pressure relief valve 138 to the tank 26. Pressure relief valve 138 is adjusted to open at a relatively low pressure and it functions to insure that at all times the conduits comprising the low pressure side of the high pressure closed circuit are maintained filled with hydraulic fluid.

The hydraulic circuit shown in the drawing also includes a low pressure circuit of which tank 26, conduit 116, pump 117, conduit 118, the hydraulic control valve unit 56, and conduit 119 form a part. In addition to the function of the low pressure circuit of supplying cooling and make-up fluid to the closed high pressure circuit, the low pressure circuit functions as a control circuit to operate the motors 47, the steering motor 62, a double acting brake cylinder motor 149 associated with the brake band 97, and the piston motors 114 and 115 of the high pressure variable delivery pump 110. All of the motor units in the low pressure circuit are controlled by individual valves of the control valve unit 56. The control valve unit 56 is fully described and claimed in my Patent No. 2,486,087, granted October 25, 1949, for a Hydraulic Valve, and therefore is described only briefly here.

As previously set forth hydraulic fluid pumped by the pump 117 normally flows through the control valve unit 56 and is discharged therefrom into conduit 119. The control valve unit 56 is comprised of a plurality of identical individual banked valves of the spool or shiftable core type, and one of the valves of the control valve unit 56 is indicated at 150. Valve 150 controls both of the piston motors 114 and 115 of pump 110. The construction of valve 150 is such that when its control lever 151 is moved to one position, hydraulic fluid flowing therethrough from the conduit 118 is diverted into a conduit 152 that leads to the cylinder head of motor 115 and this hydraulic fluid operates the piston motor 115 to move or shift the ring or housing 113 to the right. Movement of the ring or housing 113 to the right causes the piston of piston motor 114 to displace hydraulic fluid in the cylinder thereof through a conduit 153, which fluid enters the body of the valve 150 and is caused to flow through the other valves of the unit and into the conduit 119.

When the control lever 151 of valve 150 is moved in the opposite direction the flow of hydraulic fluid is reversed from that described in the conduits 152 and 153 to shift the ring or housing 113 to the left and when the control lever 151 of valve 150 is in a central or neutral position the conduits 152 and 153 are blocked whereby the piston motors 114 and 115 will be locked to maintain the ring or housing 113 in adjusted position. It is the shifting and positioning of the ring or housing 113 with respect to the rotor 111 which affects the output volume of hydraulic fluid being pumped by pump 110 which, of course, controls the speed of operation of motor 72 as well as its direction of operation for driving the roll of the trench roller.

The control valve unit 56 includes three other valves 154, 155 and 156, all identical in construction with valve 150. Valve 154 controls the operation of the expandable and contractable or double acting hydraulic piston motors 47, which piston motors are connected in parallel and to the valve 154 by conduits 157 and 158. Valve 155 controls the operation of the steering motor 62 through conduits 159 and 160. The valve 156 controls the double acting piston motor 149 associated with the brake band 97 for positively contracting it about the drum 96 and for positively expanding it therefrom. The valve 56 includes a drain conduit for collecting hydraulic fluid that might support its cores or spools, and this drain conduit is connected by a conduit 162 that returns the hydraulic fluid to the tank 26.

From the description of the valve unit 56 herein given it will be seen that when hydraulic fluid is diverted, for example, from conduit 118 by the valve 150 into conduit 152, a volume of hydraulic fluid substantially equal to the volume of fluid diverted into conduit 152 will be supplied through conduit 153 from the piston motor 114 to the conduit 119 and thus the flow of hydraulic fluid through conduit 119 will be uninterrupted. Because all of the valves 150, 154, 155 and 156 are alike, when any one of them is actuated to divert hydraulic fluid to one of the control motors, then a volume of fluid substantially equal to that diverted by the valve to the motor which it controls will also be displaced from the motor through the valve and into the conduit 119. The structure of the valves is such that any two or all of them may be operated to control simultaneously their respective motors.

All of the motors controlled by the individual valves of valve unit 56 are expandable and contractable piston and cylinder type motors and by referring to the motors 47 for an example it will be seen that should the control lever or valve 154 be moved to cause hydraulic fluid pumped by the pump 117 to be diverted to the conduit 158 and to the cylinders 48 of motors 47, the pistons of the motors 47 will move upwardly to the upper limit of their strokes and when the pistons reach this upper limit they will have displaced substantially all of the hydraulic fluid thereabove from the cylinders 48 through the conduit 157 into the conduit 119. It will be seen that when the pistons of the motors 47 reach this upper limit of their strokes and can travel no further, the conduit 158 will be effectively blocked and therefore the pump 117 would stall, thus stalling the pump 110 because both pumps 117 and 110 are driven from the same shaft. Accordingly I have provided a by-pass circuit including a pressure relief valve 161 that connects the conduits 118 and 119 to by-pass the control valve unit 56. The by-pass including pressure relief valve 161 will operate when any one of the piston motors controlled by any of the individual valves of the control valve unit 56 is stalled or has reached the end of its stroke and therefore there will always be hydraulic fluid flowing in the conduit 119. It will also be seen that while the motors controlled by the valves of control valve unit 56 as herein shown are all of the double acting piston or cylinder type, if desired one or all of the motors may be of the rotary type.

From the foregoing description it will be seen that the hydraulic circuit is an improved circuit wherein at all times part or all of the hydraulic fluid discharged from a secondary or low pressure circuit, which preferably is a control circuit including a constant volume pump, is fed to the intake port of a high pressure and preferably a variable volume pump in a main, primary, or high pressure substantially closed circuit from which hydraulic fluid is constantly being displaced as it passes or is exhausted by a high pressure reversible motor therein because of the addition of the cooling and make-up fluid thereto discharged from the secondary circuit.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A hydraulic circuit including a relatively high volume and high pressure reversely operable pump and a reversible hydraulic motor connected in circuit therewith, said circuit including a pair of conduits one connecting the high pressure output port of said pump with the inlet port of said motor and the other connecting the low pressure intake port of said pump with the exhaust port of said motor whereby fluid in said circuit is recycled, said conduits being adapted to function alternately as high or low pressure conduits depending upon the direction of operation of said pump, pressure relief valve means, pressure operated valve means connected with both of said alternately operable conduits operated by pressure in either of said conduits acting as the high pressure conduit to connect the other conduit with said pressure relief valve means, a relatively low volume pump, conduit means including a pair of check valves connecting the output port of said low volume pump with both of said alternately operable conduits between the ports of said high volume and high pressure pump and said pressure relief valve means, said check valves being operable to isolate said conduit from the acting high pressure conduit and to divert the entire output of the low volume pump into the acting low pressure conduit whereby the entire output volume from said low volume pump is received by said high volume and high pressure pump and the addition thereof into the acting low pressure conduit displaces hydraulic fluid discharged from said motor through the pressure relief valve means.

2. A hydraulic system including a relatively high volume and high pressure pump and a hydraulic motor connected in circuit therewith, said circuit including a high pressure conduit connecting the output port of said pump with the inlet port of said motor and a low pressure conduit connecting the exhaust port of said motor with the intake port of said pump whereby fluid in said circuit is recycled, a discharged means in said low pressure conduit, a relatively low volume pump, conduit means connecting the output port of said low volume pump with said low pressure conduit between the inlet port of said high pressure and high volume pump and the discharge conduit means therein whereby the volume of hydraulic fluid pumped into the low pressure conduit will cause displacement therefrom of some of the hydraulic fluid exhausted by said motor through said discharge conduit means, hydraulic motor means in said conduit means connecting said low volume pump with said low pressure conduit, valve means interposed in said conduit connecting said low volume pump with said low pressure conduit, said valve being adapted when inoperative to pass hydraulic fluid therethrough and when operated to divert hydraulic fluid to said hydraulic motor means and to direct the hydraulic fluid exhausted from said second motor back to said conduit means connecting said low volume pump with said low pressure conduit, and a pressure relief valve adapted to by-pass said valve means whereby the flow of hydraulic fluid into said low pressure conduit will remain substantially uninterrupted during the operation or a stalled conduit of said motor means.

FRED J. WRIGHT.

REFERENCES CITED

The following references are of record in the file of this patent:

UNITED STATES PATENTS

| Number | Name | Date |
| --- | --- | --- |
| 2,345,920 | Douglas | Apr. 4, 1944 |
| 2,473,711 | Kearns | June 21, 1949 |
| 2,517,005 | MacDuff | Aug. 1, 1950 |
| 2,541,290 | Robinson | Feb. 13, 1951 |

FOREIGN PATENTS

| Number | Country | Date |
| --- | --- | --- |
| 234,209 | Great Britain | May 28, 1925 |
| 385,325 | Germany | Dec. 12, 1923 |